United States Patent [19]

Johnson

[11] Patent Number: 5,263,230
[45] Date of Patent: Nov. 23, 1993

[54] CAM OPERATED HEATER CLAMP WITH LOCKING DEVICE AND ROTATIONAL POSITION INDICATOR

[76] Inventor: James E. Johnson, 11881 Thornhill Rd., Eden Prairie, Minn. 55344

[21] Appl. No.: 904,998
[22] Filed: Jun. 26, 1992
[51] Int. Cl.$^5$ .............................................. F16L 33/02
[52] U.S. Cl. .......................................... 24/19; 24/268
[58] Field of Search ..................... 24/268, 269, 19, 24, 24/25, 483, 484

[56] References Cited

U.S. PATENT DOCUMENTS

| | | | |
|---|---|---|---|
| 1,896,988 | 2/1933 | Van Derhoof | 24/19 X |
| 2,669,729 | 2/1954 | Stader | 24/268 X |
| 4,859,176 | 8/1989 | Meyer | |
| 4,968,247 | 11/1990 | Olson | |

*Primary Examiner*—James R. Brittain
*Attorney, Agent, or Firm*—Palmatier, Sjoquist & Helget

[57] ABSTRACT

An improvement in cam operated clamps for clamping heater elements to the nozzles of injection molding equipment. The clamp is adjusted by the rotation of a cam shaft parallel to the nozzle axis. The clamp housing consists of a circular cylinder with a longitudinal slit. Journals for the cam shaft are mounted on one side of the slit and the cam follower is mounted on the opposite side of the slit. Adjustment of the cam shaft increases or decreases the width of the slit providing the clamping action. Attached to the clamp housing is a tab which stops the cam pin rotation at an optimum position just beyond the position of maximum clamping effect. This position provides substantially the maximum clamping effect available from the clamp and effects a torque on the cam pin which holds the cam follower against the stop tab locking the clamp in place. In an alternative embodiment, a protrusion extends downward from the inside of one of the cam journals and mates with a indentation on the cam pin at the rotational position of maximum clamping effect. The added rotational resistance provided by the engagement of the protrusion in the indentation effectively locks the clamp in place.

6 Claims, 3 Drawing Sheets

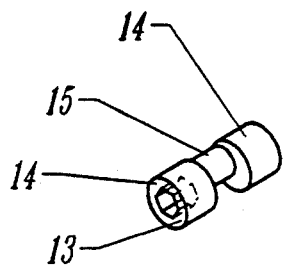
FIG.-4
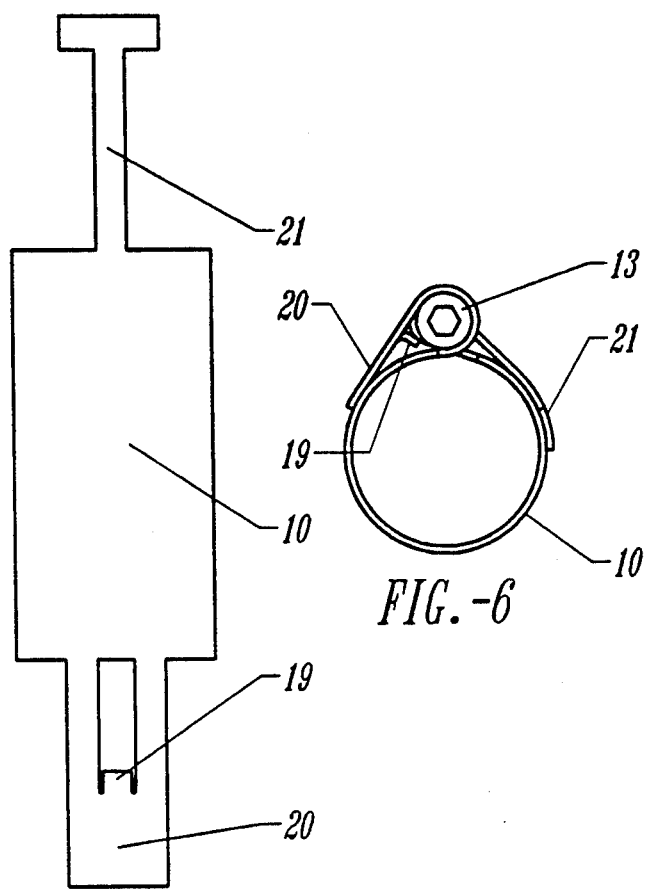
FIG.-5
FIG.-6
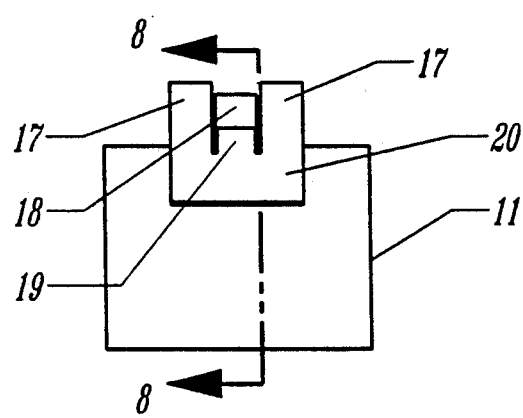
FIG.-7
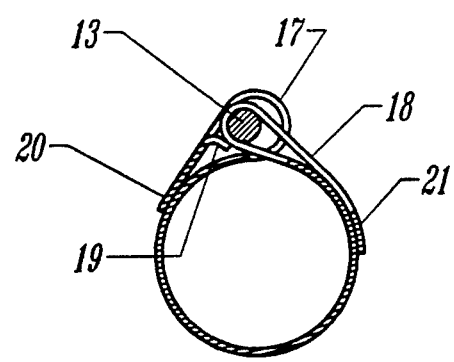
FIG.-8

CAM OPERATED HEATER CLAMP WITH LOCKING DEVICE AND ROTATIONAL POSITION INDICATOR

BACKGROUND OF THE INVENTION

1. Field of the Invention

The present invention relates to cam operated cylindrical clamps for securing heaters onto injection molding nozzles.

2. Description of Prior Art

Injection molding machines typically have a cylindrical nozzle which engages with a receptacle on a mold. Thermoplastic material is injected through the nozzle into the mold. A cylindrically wound electric heater element is used to maintain proper nozzle temperature. A cylindrical clamp which surrounds the heater element is used to maintain the appropriate thermal contact between the heater and the nozzle. Proper thermal contact is necessary to maintain the quality of the molding operation and to maximize the life of the heater element. Depending on the configuration of the molding equipment, the heater clamp on the injection nozzle is often difficult to access with adjustment tools and visual access also can be limited.

Prior art clamps use various mechanisms to provide the clamping action. Two such clamps using different mechanisms are shown in U.S. Pat. Nos. 4,968,247 and 4,859,176.

The clamp as shown in U.S. Pat. No. 4,859,176 to Meyer has 5 moving parts. The tightening of the clamp is accomplished by rotating 2 screws. Typically, the adjustment tool such as an Allen wrench will have to be inserted into each of the adjustment screw heads and rotated through an arc repeatedly until the clamp is adequately tightened. The user subjectively determines by feel when each screw and the clamp are sufficiently tight. The clamp tightness is maintained by internal friction of the device. Depending on several variables, including the physical and visual accessibility of the heater clamp in the molding equipment, the tightening process can take several minutes.

The clamp shown in U.S. Pat. No. 4,968,247 to Olson shows a configuration of a cam operated heater clamp. The clamp utilizes a cam pin and cam follower loop as the clamping mechanism where the tightness of the clamp is adjusted by rotation of the cam pin. The rotational position of the cam pin for maximum clamping effect is where the cam portion is directly opposite the connection point between the cam follower loop and the clamp housing with reference to the central axis of the cam pin hubs. At this rotational position the circumference of the circular clamp housing is at its minimum, the clamping force is at the maximum, and the tension in the clamp housing and cam follower loop is at the maximum. Internal friction, primarily between the cam pin and the cam journals, and between the cam portion and the cam follower, creates the rotational resistance of the cam pin. As the tension in the cam follower loop increases the internal friction increases and consequently the rotational resistance of the cam pin increases. At the point of maximum clamping effect the rotational resistance is at the maximum. The rotational resistance is relied upon to hold the clamp in its clamped position.

The rotational position of the cam pin for maximum clamping effect during adjustment of the Olson clamp can be determined by one of two means. First, by rotating the cam pin back and forth through an arc while subjectively feeling the rotational resistance of the cam pin and estimating the approximate position of maximum tension in the clamp. Secondly, by visually observing the position of the cam pin while adjusting it.

Either method of determining the proper rotational position during adjustment is subject to error, especially if visual or physical access to the nozzle is limited, such as by the molding assembly. When the adjustment of the cam pin does not set the cam portion at the proper rotational position for maximum clamping effect, the tension in the cam follower loop provides a component of force that effects a torque on the cam pin which may inadvertently loosen the clamp. This is especially the case where there is not adequate internal friction in the cam parts or where there are vibrational forces present. When the clamp loosens, proper thermal contact between the heater element and the nozzle is lost which can cause problems in the molding operation and a shortened life expectancy of the heater element.

It is desired to have a quicker, simpler, and more definitive means of determining the appropriate position of the cam pin during adjustment for optimal tightness and a reliable locking means to prevent inadvertent loosening of the clamp.

SUMMARY OF THE INVENTION

The present invention relates to cam operated cylindrical heater clamps for nozzles of injection molding apparatus or similar applications. The present invention provides means that readily indicates the rotational position where a cam operated heater clamp is adjusted for optimal clamping effect. The invention further provides means for locking the clamp at the position of optimal clamping effect to prevent inadvertent loosening of the clamp and resulting problems with the molding operation or a decrease in the heater element life.

Cam operated heater clamps are adjusted by rotation of a cam pin parallel to the nozzle axis. The clamp housing consists of a circular cylinder with a longitudinal slit. Journals for the cam pin are mounted on one side of the slit and the cam follower loop is mounted on the opposite side of the slit. Rotation of cam pin increases or decreases the width of the slit and correspondingly the circumference of the clamp effecting the clamping action. One embodiment of the present invention provides a stop tab to stop the rotation of the cam pin by obstructing the cam follower loop engaged with the cam pin at a rotational position just beyond the position of maximum clamping effect. The heater clamp with the heater element is slid onto the nozzle and the cam pin is rotated until it is stopped by the stop tab. This rotational position provides substantially the maximum clamping effect available from the clamp and in this rotational position the tension in the cam follower loop provides a torque on the cam pin which holds the cam follower loop engaged with the cam pin against the stop tab locking the clamp in place.

In an alternative embodiment of the invention, a protrusion extends down from the inside of one of the cam journals contacting the surface of the cam pin hub. At the rotational position of maximum clamping effect the protrusion mates with an indentation in the cam pin effectively locking the clamp in place.

BRIEF DESCRIPTION OF THE DRAWINGS

FIG. 4 is a perspective of the cam pin.

FIG. 5 is a top plan view of the heater clamp housing before forming.

FIG. 6 is an end elevational view of the heater clamp.

FIG. 7 is a side elevational view of the heater clamp.

FIG. 8 is a sectional view taken on line 8—8 shown in FIG. 7.

DETAILED DESCRIPTION OF THE PREFERRED EMBODIMENT

Figure 1:
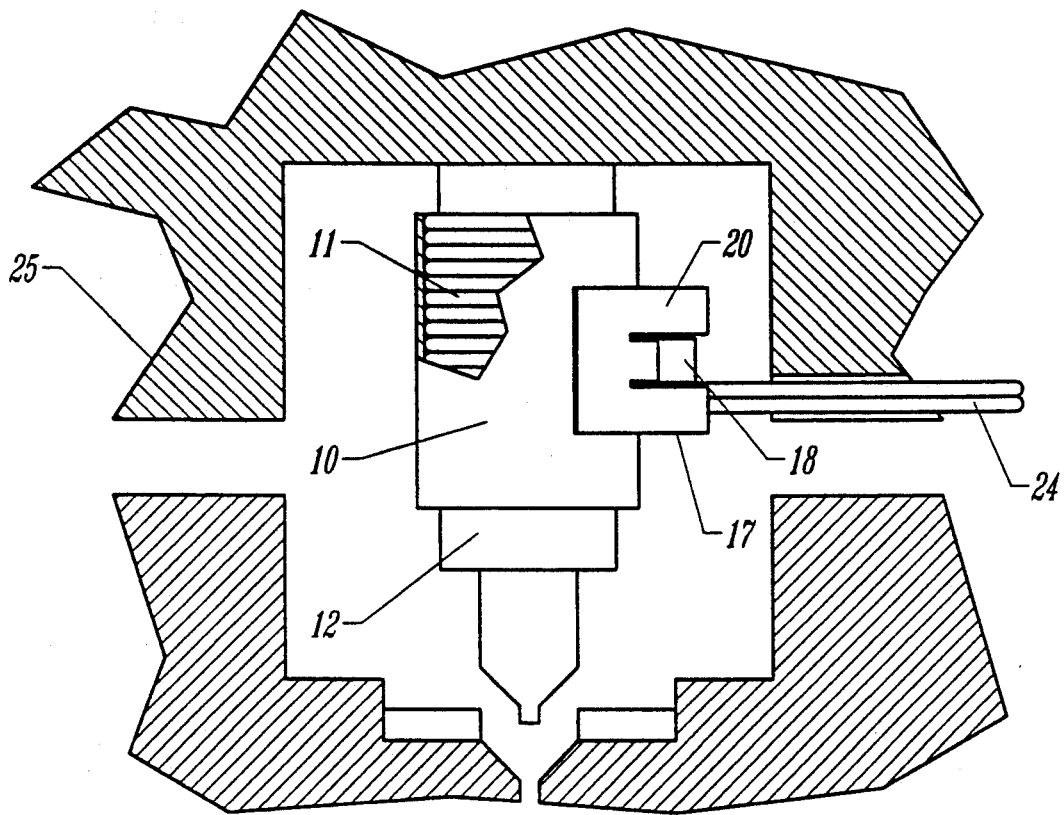
FIG. 1 is a side elevational view of a heater clamp and heater coil in place on an injection nozzle, with part of the housing broken away to expose the heater element.
Figure 2:
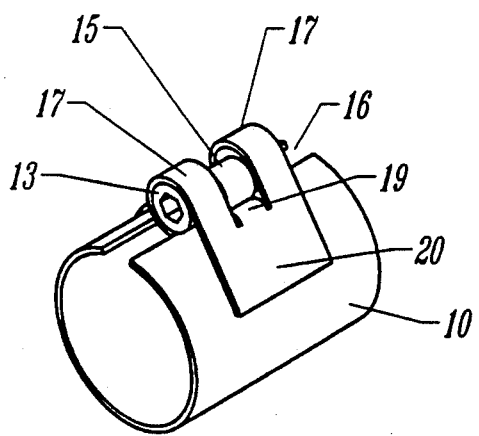
FIG. 2 is a perspective of the heater clamp showing the stop tab with the cam parts.
Figure 3:
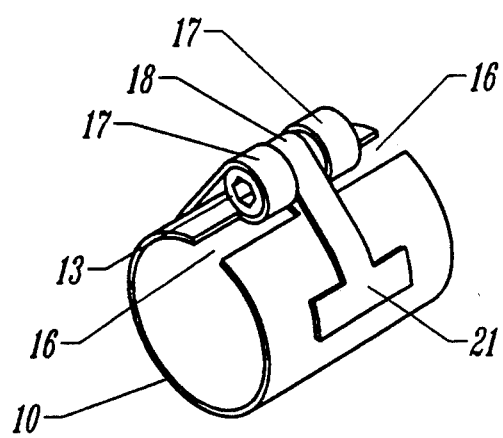
FIG. 3 is a perspective of the heater clamp showing the side opposite that of FIG. 2.

A cam operated heater clamp is generally shown in FIGS. 1, 2, and 3. A clamp housing 10 circular in shape, encloses and clamps a heater element 11 to an injector nozzle 12 of the injection molding assembly 25 shown in FIG. 1.

The clamp housing 10 is tightened or loosened by operation of the cam pin 13, shown in detail in FIG. 4.

The clamp housing 10 has a longitudinal slit 16 with cam journals 17 connected to the housing 10 on one side of the slit 16 and a cam follower loop 18 attached to the housing 10 on the opposite side of the slit 16. Rotation of the cam pin 13 changes the position of the central cam portion 15 engaged with the cam follower loop 18 relative t o the central axis of the cam pin 13 thereby changing the width of the slit 16 in the clamp housing 10. This changes the diameter and the circumference of the clamp housing 10 thereby producing the clamping action.

A stop tab 19 integral with the housing 10 obstructs the rotation of the central cam portion 15 of the cam pin 13 stopping the rotation of the cam pin 13 at a predetermined optimal rotational position.

The clamp housing 10 is formed from a flat sheet such as No. 304 stainless steel with a thickness of 0.032 inches. The general shape of the housing 10 for forming is shown in FIG. 5. On one end is a W-shaped member 20 and on the opposing end is a T-shaped member 21, both integral with the housing 10.

The central portion of the housing 10 is rolled or formed to a diameter to fit on and enclose the heater element 11. The W-shaped member 20 is rolled or formed in a direction opposite that of the central cam portion 15 and to a diameter sized to fit the hubs 14 of the cam pin 13 as shown in FIGS. 3 and 6. The distal portion of the W-shaped member 20 is attached to the exterior of the housing 10 by a means such as spot welding. See FIG. 7. The W-shaped member 20 thus forms the journals 17 for the cam pin 13 as shown in FIGS. 2 and 6.

The T-shaped member 21 is rolled or formed in the direction opposite to that of the central cam portion 15 of the housing 10. The mid section of the T shaped member 21 loops around the central cam portion 15 of the cam pin 13 as shown in FIGS. 3 and 8. The distal portion of the T-shaped member 21 is attached to the exterior of the housing 10 by a means such as spot welding. The T-shaped member 21 thus forms the cam follower 18 engaged with the central cam portion 15 of the cam pin 13.

As shown in FIGS. 6 and 8 the stop tab 19 portion of the W-shaped member 20 is bent inward so as to protrude in the area between the hubs 14 of the cam pin 13. The stop tab 19 interferes with the movement of the central cam portion 15 of the cam pin 13 thereby preventing the rotation of the cam pin 13 beyond a predetermined rotational position.

As can be seen in FIGS. 2, 3, and 8, the clamping effect occurs as the cam pin 13 is rotated and the width of the slit 16 is increased or decreased by the action of the cam follower 18 which is connected to the clamp housing 10 at one end and engaged with the central cam portion 15 at the opposite end.

Referring to FIG. 8, the maximum clamping effect occurs when the cam pin 13 is adjusted to the rotational position where, when viewed from the end, the central axis of the hubs 14 is positioned between and in alignment with the central axis of the central cam portion 15 and the connection of the cam follower 18 with the clamp housing 10. This rotational position corresponds to minimum circumference and minimum diameter of the clamp housing 10. As shown in FIG. 8, the stop tab 19 is located to stop the rotation of the central cam portion 15 of the cam pin 13 at a position which is slightly beyond the point of maximum clamping effect. At this position the cam follower loop 18 engaged with the central cam portion 15 makes contact with the stop tab 19. When the clamp is engaging a heater element 11 and nozzle 12 as shown in FIG. 1, the clamping effect creates a tension in the housing also known as a hoop stress. This tension is transferred to the cam follower loop. The tension in the cam follower loop 18 exerts a torque on the cam pin 13 tending to hold the cam follower 18 engaged with the central cam portion 15 against the stop tab 19 creating the locking effect. To loosen the clamp the cam pin 13 must be rotated back through the position of minimum circumference before the clamp can be loosened. The force exerted by the object clamped resists a decrease in circumference of the housing preventing release of the clamp unless sufficient torque is applied to the cam pin to overcome the torque exerted on the cam pin by the tension in the cam follower loop and any rotational resistance due to internal friction. The tension in the cam follower loop 18 thus effectively prevents inadvertent loosening of the clamp without relying on internal friction. An appropriate position for locating the stop tab 19 is where the central cam portion 15 of the cam pin 13 stops at 5 degrees beyond the rotational position of maximum clamping effect.

Figure 9:
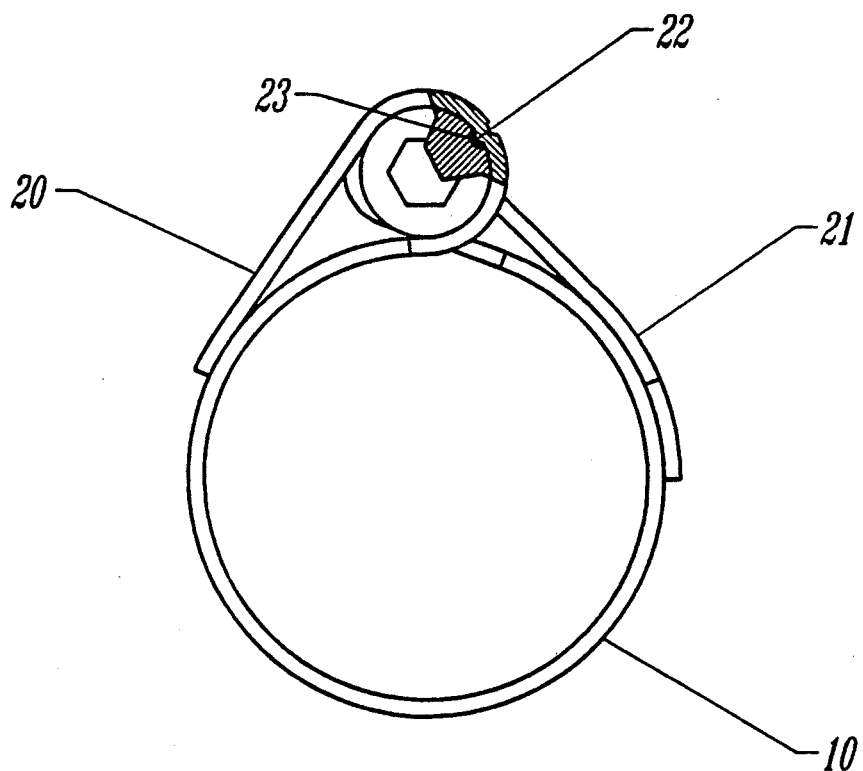
FIG. 9 is an end view with a partial sectional showing a protrusion and an indentation in an alternative embodiment of the invention.

An additional embodiment of the invention is shown in FIG. 9. In this embodiment the stop tab 19 is absent; rather a protrusion 22 extends inward on one of the cam journals 17. The protrusion 22 mates with an indentation 23 in the cam pin hub 14 when the cam pin 13 is adjusted to the maximum clamping effect. As the cam pin 13 is rotated the rotation resistance abruptly changes when the protrusion 22 becomes engaged with the indentation 23 thus indicating the position of maximum clamping effect. To release the clamp from the clamped position sufficient torque must be applied to overcome the rotational resistance in the cam parts and to disengage the protrusion 22 from the indentation 23. The protrusion 22 and indentation 23 thus provide a locking effect.

It is thought that the cam operated heater clamp with locking means and rotational position indicator and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A cylindrical heater clamp comprising:

a housing generally cylindrical in shape and which has a slit extending the longitudinal length of the housing, the housing having a W-shaped member integral with the housing on one side of the slit, and a T-shaped member integral with the housing on the opposite side of the slit, the W-shaped member rolled to form a pair of cam journals, the T-shaped member looped to form a cam follower, a rotatable cam member with a central axis and a cam portion, the cam member engaged within the cam journals and the cam portion engaged within the cam follower, whereby the cam portion changes its effective position relative to the central axis when the cam member is rotated, whereby, rotation of the cam member causes the spacing between the edges of the slit to change, causes the circumference and the diameter of the housing the change and creates the clamping effect, wherein the cam member has a rotational position of maximum clamping effect, and wherein the W-shaped member further comprises a stop tab extending inwardly between the cam journals, whereby the stop tab interferes with the rotation of the cam member.

2. The clamp of claim 1 wherein the stop tab obstructs the rotation of the cam portion by contacting the cam follower engaged with the cam portion when the cam member is at a specified rotational position thereby preventing rotation of the cam member beyond the specified rotational position.

3. The clamp of claim 2 wherein the specified rotational position of the cam member is slightly past the rotational position of the maximum clamping effect, whereby when the cam member is rotated through the position of maximum clamping effect to the specified rotational position, a tension exists in the cam follower which is engaged with the cam portion, said tension locking the cam follower with the cam portion against the stop tab.

4. The clamp of claim 3, wherein the specified rotational position of the cam member is at substantially 5 degrees past the rotational position of maximum clamping effect.

5. A locking means and rotational position indicator for heater clamps, the heater clamp comprising a cylindrical housing with a slit extending the longitudinal length of the housing, a rotatable cam member with a central axis, a pair of cam hubs, and a cam portion intermediate the cam hubs, whereby the cam portion changes its effective position relative to the central axis when the cam member is rotated, a pair of cam journals mounting the cam member to the housing on one side of the slit, a cam follower attached to the housing on the opposite side of the slit and engaging the cam portion whereby rotation of the cam member causes the circumference and the diameter of the housing to change and creates the clamping effect, whereby the cam member has a rotational position of maximum clamping effect, the locking means and rotational position indicator comprising:

a stop tab attached to the housing and extending inwardly intermediate the cam journals, the stop tab obstructing the rotation of the cam member by contacting the cam follower engaged with the cam member at a specified rotational position just beyond the rotational position of maximum clamping effect, whereby a tension is created in the cam follower which locks the cam member at the specified rotational position.

6. The locking means and rotational position indicator of claim 5, wherein the stop tab attached to the housing which obstructs the rotation of the cam member at the specified rotational position of approximately 5 degrees beyond the rotational position of maximum clamping effect.

* * * * *

UNITED STATES PATENT AND TRADEMARK OFFICE
CERTIFICATE OF CORRECTION

PATENT NO. : 5,263,230
DATED : November 23, 1993
INVENTOR(S) : James E. Johnson

It is certified that error appears in the above-indentified patent and that said Letters Patent is hereby corrected as shown below:

Column 5, line 21, delete "within" and insert therefor --by--.

Column 5, line 28, delete the first occurrence of "the" and insert therefor --to--.

Column 6, line 33, delete "member" and insert therefor --portion--.

Signed and Sealed this

Second Day of August, 1994

Attest:

BRUCE LEHMAN

Attesting Officer

Commissioner of Patents and Trademarks